United States Patent [19]

Butters et al.

[11] Patent Number: 5,554,300

[45] Date of Patent: Sep. 10, 1996

[54] PURIFICATION SYSTEM

[75] Inventors: Brian E. Butters, St. Thomas; Anthony L. Powell, London, both of Canada

[73] Assignee: Purifics Environmental Technologies, Inc., Hyde Park, Canada

[21] Appl. No.: 394,548

[22] Filed: Feb. 22, 1995

[51] Int. Cl.$^6$ .................................................... C02F 1/48
[52] U.S. Cl. .......................... 210/748; 210/757; 210/763; 422/186.3
[58] Field of Search .................................. 210/748, 757, 210/763

[56] References Cited

U.S. PATENT DOCUMENTS

| | | | |
|---|---|---|---|
| 4,446,236 | 5/1984 | Clyde | 435/287 |
| 4,615,799 | 10/1986 | Mortensen | 210/117 |
| 4,694,179 | 9/1987 | Lew et al. | 250/431 |
| 4,892,712 | 1/1990 | Robertson et al. | 422/186 |
| 5,118,422 | 6/1992 | Cooper et al. | 210/636 |
| 5,174,877 | 12/1992 | Cooper et al. | 204/193 |
| 5,332,508 | 7/1994 | Foster et al. | 210/711 |

OTHER PUBLICATIONS

User's manual SCT Membranes–"Membrolox®".

*Primary Examiner*—Neil McCarthy
*Attorney, Agent, or Firm*—John G. Flaim

[57] ABSTRACT

The present invention relates to a method for the purification of contaminated fluids by photocatalytic treatment. In accordance with the invention, an oxidation state where contaminant molecules are oxidized and/or a reduction state where contaminant molecules are reduced are employed to purify a contaminated fluid. The reduction state, where certain contaminant molecules are reduced, is induced by providing a reactant, such as citric acid, in the presence of an excited photocatalyst. A reduction state may alternate to an oxidation state, where contaminant molecules are oxidized, by the addition of an oxidizing agent, such as oxygen.

14 Claims, 2 Drawing Sheets

PURIFICATION SYSTEM

FIELD OF THE INVENTION

The present invention relates generally to the purification of contaminated fluids by photocatalytic reaction.

BACKGROUND OF THE INVENTION

Contaminated fluids have been conventionally purified by photocatalytic treatment. Photocatalytic treatment is typically employed to destroy contaminants from contaminated fluids by the method of oxidation. For example, by conventional photocatalytic treatment contaminants can be oxidized into carbon dioxide and water.

There are, however, contaminants which are not readily oxidized from a contaminated fluid by conventional photocatalytic treatment. That is, there are contaminants which are "refractive" to oxidation attempts. These refractive contaminants are therefore very difficult to oxidize using conventional photocatalytic treatment. In order to oxidize refractive contaminants from a contaminated fluid, conventional photocatalytic treatment methods require an inordinate amount of time before acceptable levels can be attained. To accelerate this laborious and time consuming method, oversized and expensive treatment equipment is often used. This significantly increases the cost of fluid purification. In addition, most heavy metals, cannot be removed from contaminated fluids through oxidation.

As a result, conventional photocatalytic treatment is therefore unable to efficiently destroy some undesirable contaminants and remove metals from a contaminated fluid. Incomplete purification of the contaminated fluid thus often results. It is thus highly desirable to provide for photocatalytic treatment techniques which overcome the aforementioned problems of conventional photocatalytic treatments in order to enable the efficient, effective and complete purification of contaminated fluids.

SUMMARY OF THE INVENTION

The present invention allows for the photocatalytic treatment of contaminated fluids to be employed in both an oxidation state where some contaminant molecules are oxidized, and/or a reduction state where other contaminant molecules are reduced. This allows for the complete and efficient destruction of contaminant molecules, including refractive organic contaminants, and the removal of heavy metals by photocatalytic treatment.

An oxidation state is achieved by irradiating photocatalytic particles, such as anatase $TiO_2$, with ultraviolet light. This causes electrons to be transferred from the valence bands of the photocatalytic particles to the conduction bands of the photocatalytic particles, and consequently, for a positive hole to be formed at or near the surface of the photocatalytic particle. These electron/hole pairs allow for contaminants to be oxidized either directly or indirectly at the positive holes of the photocatalytic particles. In order to alternate the state of photocatalytic treatment of contaminant molecules from an oxidation state to a reduction state, a reactant is added to the slurry. The reactant is operable to provide "surrogate electrons" that react with the positive holes of the photocatalytic particles. The surrogate electrons of the reactant can be said to "plug" the positive holes so that electrons in the conduction bands can be employed to reduce contaminants.

The reactant chosen to change states from an oxidation state to a reduction state must readily adsorb onto the photocatalytic particles and predominately oxidize at the positive holes of the photocatalytic particles. While several different reactants may be selected for those reasons, citric acid is preferably employed as the reactant when used in conjunction with $TiO_2$ photocatalytic particles.

The timing and sequence of oxidation and reduction states to photocatalytic treatment is empirically selected based on several parameters. These parameters include the type of contaminant molecules present in the contaminant fluid and their breakdown or by-products, as well as the selections of photocatalytic particles, reactants (which donate the surrogate electrons) and the system equipment.

Other and further objects, features and advantages will be apparent from the following detailed description of the preferred embodiment of the present invention, given for the purpose of disclosure, and taken in conjunction with the accompanying drawings.

BRIEF DESCRIPTION OF THE DRAWINGS

The foregoing and other objects, aspects and advantages of the present invention will be better understood from the following detailed description of a preferred embodiment of the present invention with reference to the accompanying drawings, in which.

DETAILED DESCRIPTION OF A PREFERRED EMBODIMENT OF THE PRESENT INVENTION

As used herein, the term "contaminated fluid" is a fluid that contains undesirable organics, inorganics, metals, and possibly microbial cells or other microorganisms. Although contaminants are undesirable in the sense that they are usually toxic when ingested or contacted by humans, "undesirable" should not be understood to be restricted to such toxic substances. As used herein, the term "decontaminated effluent" means that the undesirable substances in the contaminated fluid have been altered or modified into a desirable or an acceptable substance, again, usually a substance that is non-toxic. Normally such alteration or modification of any organic substance is achieved by decomposing the substance into by-products having a smaller molecular weight than the original contaminated fluid. It should also be noted that the terms "fluids" and "effluents" should not be read or interpreted as being limited to liquids. Rather, such terms should be interpreted to include gases, such as air.

In accordance with the present invention, irradiation of a photocatalyst, which includes a plurality of photocatalytic particles, with ultraviolet light of sufficient energy, causes electrochemical modifications to the photocatalyst. Contaminant molecules, resident in the contaminated fluid, are adsorbed onto the comparably large surface areas presented by the photocatalytic particles. Resulting photocatalytic reactions between excited photocatalytic particles and the adsorbed contaminant molecules thus characterize photocatalytic treatment of the contaminated fluid.

The photocatalyst that is preferably employed in connection with the present invention are semiconductor catalysts, more specifically, metal oxide semiconductors. Anatase $TiO_2$ is the preferred metal oxide semiconductor. Alternatively, other metal oxide semiconductors, such as $TiO_3$, $ZnO$, $CdS$, $CdSe$, $SnO_2$, $SrTiO_3$, $WO_3$, $Fe_2O_3$, and $Ta_2O_5$, can be employed. The amount and concentration of photocatalyst used for the photocatalytic treatment of a given contaminated fluid is primarily dependent on the characteristics and attributes of the photocatalytic system that is utilized.

Figure 1:
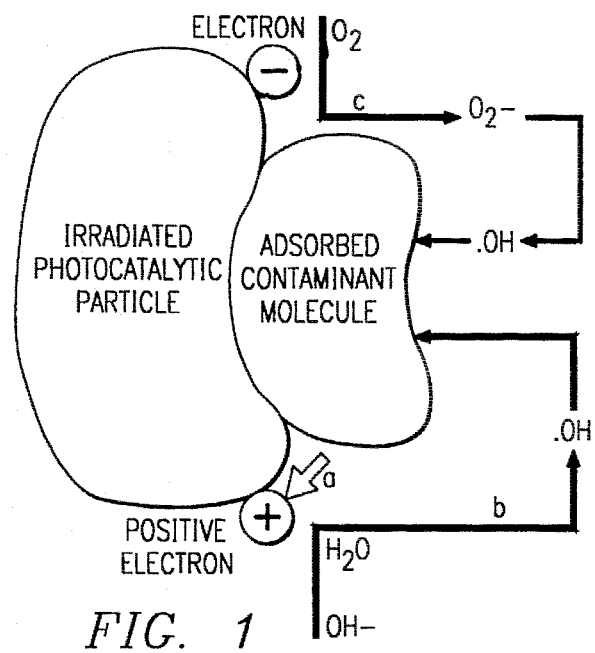
FIG. 1 illustrates an excited photocatalytic particle during the oxidation state of photocatalytic treatment, in accordance with a preferred embodiment of the present invention.

FIG. 1 illustrates an excited photocatalytic particle during the oxidation state of photocatalytic treatment, in accordance with a preferred embodiment of the present invention.

Irradiation of photocatalytic particles with ultraviolet light results in the creation of electron/hole pairs within the photocatalytic particles. That is, when a photocatalytic particle is in its excited state, an electron (negative charge) is sent from the valence band to the conduction band of the photocatalytic particle. As a consequence, a hole (positive charge) is created at or near the surface of the photocatalytic particle. Creation of electron/hole pairs, when photocatalytic particles are in their excited state, brings about the oxidation of certain contaminants from a contaminated fluid.

Acceptance of electrons at the positive holes of photocatalytic particles drives the oxidation of certain contaminants found in a contaminated fluid. Oxidation of contaminant molecules typically occurs in one of two ways. First, adsorbed contaminant molecules can directly donate electrons to the positive holes. That is, contaminant molecules oxidize at the positive holes. This is illustrated by reference numeral a of FIG. 1. Second, either adsorbed $H_2O$ or OH— ions can oxidize at the positive holes. This eventually results in the formation of hydroxyl radicals (.OH). Hydroxyl radicals, being strong oxidizing agents, in turn readily attack the adsorbed contaminants. In this instance, the adsorbed contaminants are indirectly oxidized, as illustrated by reference numeral b of FIG. 1.

Conduction band electrons react with oxidizing agents that include "electron acceptors" to generate dioxygen anion ($O_2$—) species or superoxide ions. Such oxidizing agents include oxygen, ozone, hydrogen peroxide, persulphate ions, bromate ions, chlorate ions, peroxymonophosphate ions, peroxymonosulphate ions, perchlorate ions, permanganate ions, ferrate ions, peroxyacetic acid, as well as others known to those of skill in the art. Superoxide ions can undergo further reactions to create hydroxyl radicals. Those hydroxyl radicals will then also attack the adsorbed contaminant molecules. This is illustrated by reference numeral c of FIG. 1.

Electron/hole pairs (which are caused by irradiation of photocatalytic particles) in the presence of oxidizing agents, such as oxygen, provide for an "oxidation state" whereby adsorbed contaminants are oxidized. However, not all contaminants are responsive to oxidation. In those instances, the present invention provides for a "reduction state" whereby electrons in the conduction bands of photocatalytic particles are utilized to chemically reduce certain other contaminants.

Figure 2:
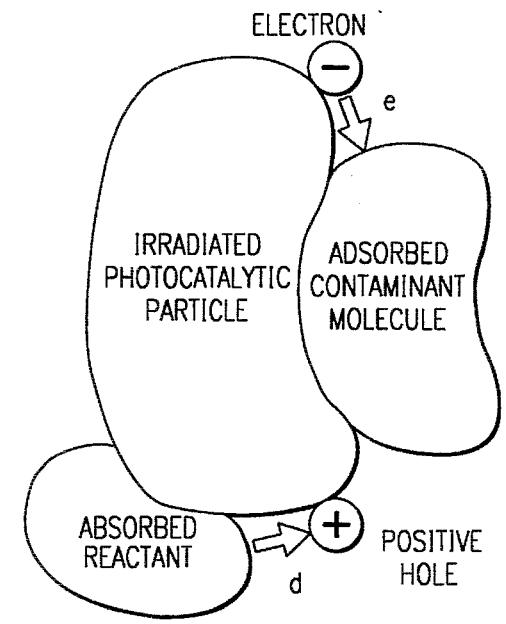
FIG. 2 illustrates an excited photocatalytic particle during the reduction state of photocatalytic treatment, wherein contaminant molecules are reduced, in accordance with a preferred embodiment of the present invention.

FIG. 2 illustrates an excited photocatalytic particle during the reduction state of photocatalytic treatment, in accordance with a preferred embodiment of the present invention.

The present invention establishes a reduction state by providing a reactant having "surrogate electrons" that react with the positive holes formed on the photocatalytic particles. In other words, the reactant donates electrons to the positive holes of the photocatalytic particles. Surrogate electrons will thus essentially "plug" the positive holes. This is illustrated in FIG. 2 by reference numeral d. As a consequence, electrons are left in the conduction bands of the photocatalytic particles. Those electrons can be relied on to reduce certain other contaminants that accept free electrons. This is illustrated by reference numeral e of FIG. 2.

In order to effectively plug the positive holes created in excited photocatalytic particles, the reactant providing the surrogate electrons must readily adsorb onto the photocatalytic particles as well as easily and predominantly oxidize directly at the positive holes, as opposed to causing a hydroxyl radical attack. The reactant is preferably introduced to the contaminated fluid and photocatalytic particles in the absence of oxidizing agents, such as oxygen, which provide electron acceptors. By eliminating the oxidizing agents, the competition for conduction band electrons is minimized. This serves to increase the rate at which targeted contaminant molecules are reduced. Accordingly, it is preferable to deaerate and deoxygenate the environment in which the contaminated fluid and photocatalytic particles are present.

Various reactants, or reducing agents, can be used to induce the reduction state, depending on the contaminated fluid, the targeted contaminant molecules, and the photocatalytic particles involved. Reactants, utilized to provide the surrogate electrons in the photocatalytic treatment of a contaminated fluid with a metal oxide photocatalyst, preferably comprise a carboxylic acid. More preferably, a hydroxy carboxylic acid, such as mandelic acid or salicylic acid, comprises the reactant. Most preferably, a hydroxy tricarboxylic acid comprises the reactant, such as citric acid (2-hydroxy-1,2,3-propanetricarboxylic acid). Citric acid is widely distributed in plants and animal tissue and fluids. It is commonly used in beverages, pharmaceutical syrups, effervescent powders and tablets, and to adjust the pH in foods. For example, lemon juice consists of between 5% to 8% of citric acid. Its non-toxic and simple nature lends itself to be an ideal substance for use as a reactant in the photocatalytic treatment of contaminated fluids.

The concentration of reactant used to induce a reduction state is dependent on the characteristics and attributes of the contaminated fluid, including the concentration of the contaminant molecules found in the contaminated fluid that are being targeted for reduction and the ease at which those contaminants are reduced. As such, the concentration of reactant is preferably empirically determined based primarily on the characteristics and attributes of a given contaminated fluid.

Figure 3:
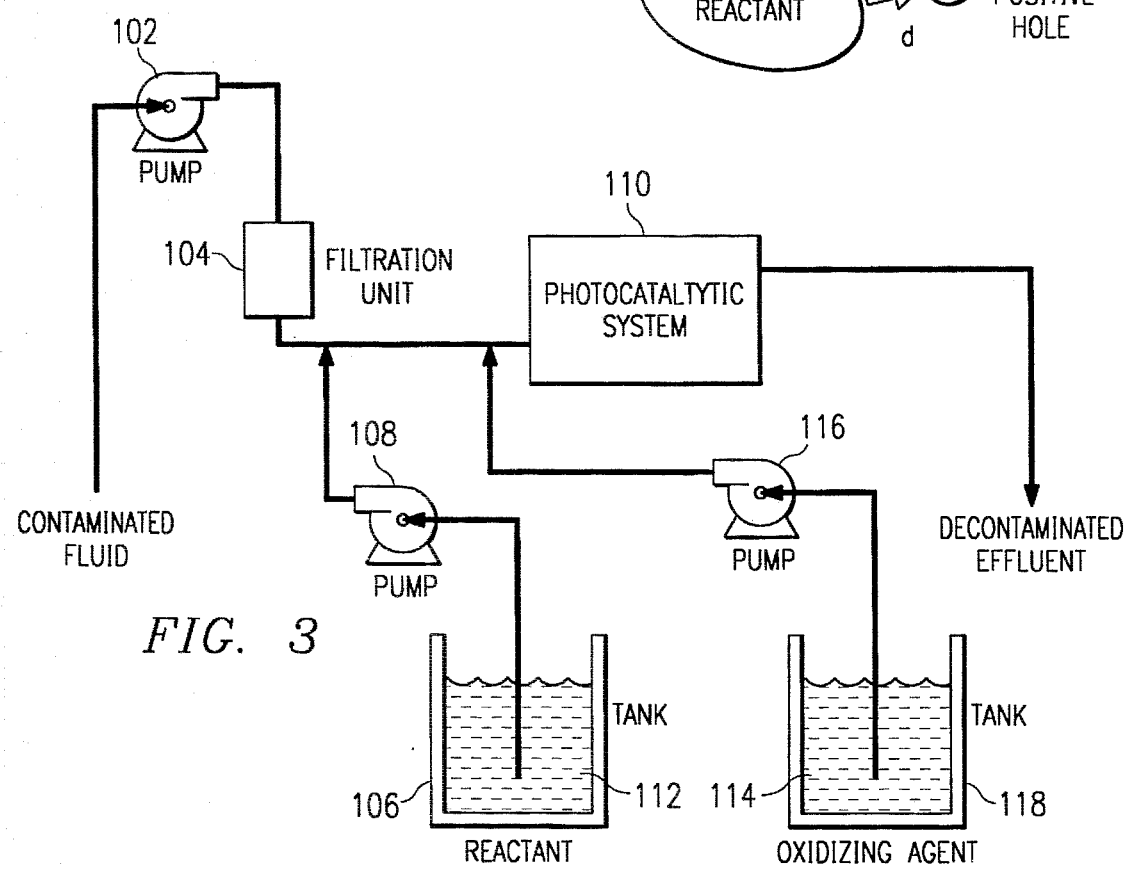
FIG. 3 is a process flow diagram of a purification system, in accordance with a preferred embodiment of the present invention.

FIG. 3 illustrates a system for purifying fluids, in accordance with a preferred embodiment of the present invention. Contaminated fluid is collected and pumped by pump 102 to filtration unit 104. Filtration unit 104 is preferably operable to remove any visible debris from the contaminated fluid. Contaminated fluid, after being subjected to gross filtration by filtration unit 104, is directed to photocatalytic system 110. Photocatalytic system 110 has photocatalytic particles resident therein for combination with the contaminated fluid. The combination of contaminated fluid and the photocatalytic particles forms a slurry. In the slurry, photocatalytic particles are preferably evenly distributed amongst the contaminant molecules resident in the contaminated fluid. Photocatalytic system 110 also includes one or more sources of ultraviolet light that are operable to irradiate the photocatalytic particles resident in the system in order to bring about photocatalytic reactions. Photocatalytic system 110 preferably also includes one or more separation units that are operable to separate photocatalytic particles from a treated slurry in order to recover a decontaminated effluent.

Photocatalytic system 110 can be constructed in accordance with the system set forth in U.S. patent application Ser. No. 08/205,669 entitled "Method and System for Photocatalytic Decontamination," by Brian E. Butters and Anthony L. Powell, filed Mar. 3, 1994, and assigned to Purifics Environmental Technologies, Inc., which is hereby incorporated by reference for all purposes. Alternatively, photocatalytic system 110 can employ photocatalytic particles that are immobilized on a substrate. Photocatalytic particles can be affixed to the substrate by relatively weak forces or chemically bonded to the substrate. Ultraviolet light is directed towards the substrate and the photocatalytic particles affixed thereon. Photocatalytic reactions result when contaminated fluid is passed through the irradiated substrate. For example, a cylindrical matrix constructed by a series of fiberglass strands onto which photocatalytic particles are bonded, with an ultraviolet light source disposed in the center of the cylindrical matrix, can be employed to treat a contaminated fluid. Other types of photocatalytic system 110 can be utilized, as is well known by those skilled in the art.

A tank, identified by reference numeral 106, is provided in association with pump 108. Tank 106 preferably contains a reactant, identified by reference numeral 112, which is capable of inducing a reduction state in photocatalytic system 110. Reactant 112 is a "surrogate electron donor" in that it includes surrogate electrons that donate electrons to the positive holes formed on the photocatalytic particles. Pump 108 is operable to introduce reactant 112 to photocatalytic system 110. Such introduction can occur at selected or predetermined times and intervals. Thus, reactant 112 can be introduced at different stages of the photocatalytic treatment of a contaminated fluid. Decontaminated effluent is recovered from treatment system 110 once a desirable level of contaminants is achieved.

Treatment can be returned from a reduction state to an oxidation state by the present invention. This is accomplished by the addition of an oxidizing agent that includes electron acceptors. A second tank, identified by reference numeral 118, preferably contains the oxidizing agent, which is identified by reference numeral 114. Pump 116 is operable to introduce oxidizing agent 114 to photocatalytic system 110. Like reactant 112, oxidizing agent 114 can be introduced to photocatalytic system 110 at selected or predetermined times and intervals to induce an oxidation state.

Photocatalytic treatment of contaminated fluids can therefore be manipulated in order to alternate or shift between oxidation and reduction states. Reactants (surrogate electron donors), such as citric acid, can be added at any point during the photocatalytic treatment of a contaminated fluid to induce a reduction state. The sequence and duration of oxidation and reduction environments can thus be varied for each treatment by the timing of the introduction of the reactant. Variations of sequence and duration are primarily dependent on the composition of the contaminated fluid. The sequence and duration of oxidation and reduction environments is therefore preferably empirically determined based on the composition of the contaminated fluid.

A reduction state is preferably used to reduce contaminant molecules that are refractive to oxidation, i.e., refractive contaminants. Halogenated alkanes (carbon tetrachloride, chloroform, dichloroethane, methylene chloride, trichloroethane and pentachloroethane), freons, chlorofluorocarbons and trinitrobenzene, are refractive contaminants that are each particularly resistant to oxidation attempts.

When refractive contaminants are the only contaminant molecules present in a contaminated fluid, then a reduction state is preferably initially induced.

When refractive contaminants and contaminants that can be oxidized are present in a contaminated fluid, both oxidation and reduction states are preferably utilized. For example, contaminated water, which includes contaminants that are readily oxidized as well as one or more contaminants that are particularly resistant to oxidation, such as trinitrobenzene, is preferably purified by providing an oxidation state followed by a reduction state. A second oxidation state may also be necessary to oxidize any residual reactant used to induce the reduction state, such as citric acid. However, if the contaminants that are readily oxidized can be mineralized to carbon dioxide and water, it is preferable to first induce a reduction state followed by an oxidation state. This will ensure that all of the reactant is oxidized.

The present inventive technique, therefore, seeks to minimize the time required for purification of a contaminated fluid by alternating between oxidation and/or reduction states. According to the invention, several process parameters (and combinations thereof) are considered to empirically determine the best approach to a given contaminated fluid. Among the process parameters which may be selected in the photocatalytic treatment of a contaminated fluid are:

types of contaminant molecules included in the contaminated fluid breakdown or by-products of the contaminant molecules photocatalytic particles selected reactant (which supplies surrogate electrons) selected equipment selected For example, one may seek to purify a contaminated fluid that contains 2,4,6-trinitrotoluene (TNT) and 1,3,5-trinitrobenzene (TNB) contaminant molecules. In order to remove those contaminants from a contaminated fluid, the TNT is preferably oxidized through photocatalytic treatment. As the TNT is oxidized and its concentration lowered, the concentration of TNB is increased. This results since TNB is a by-product of TNT and is refractive to oxidation. Once the concentration of TNT has decreased such that it reaches an acceptable level, an appropriate reducing agent can be added to photocatalytic system 110. The addition of the reducing agent to photocatalytic system 110 brings about a reduction state wherein the concentration of TNB is dramatically decreased in a short period of time.

In a particular example, a contaminated influent includes a concentration of TNT averaging approximately 1000 parts per billion ("ppb") and a concentration of TNB averaging approximately 500 ppb, is subjected to photocatalytic treatment. In this particular example, citric acid is employed to bring about a reduction state for the destruction of TNB contaminants.

Figure 4:
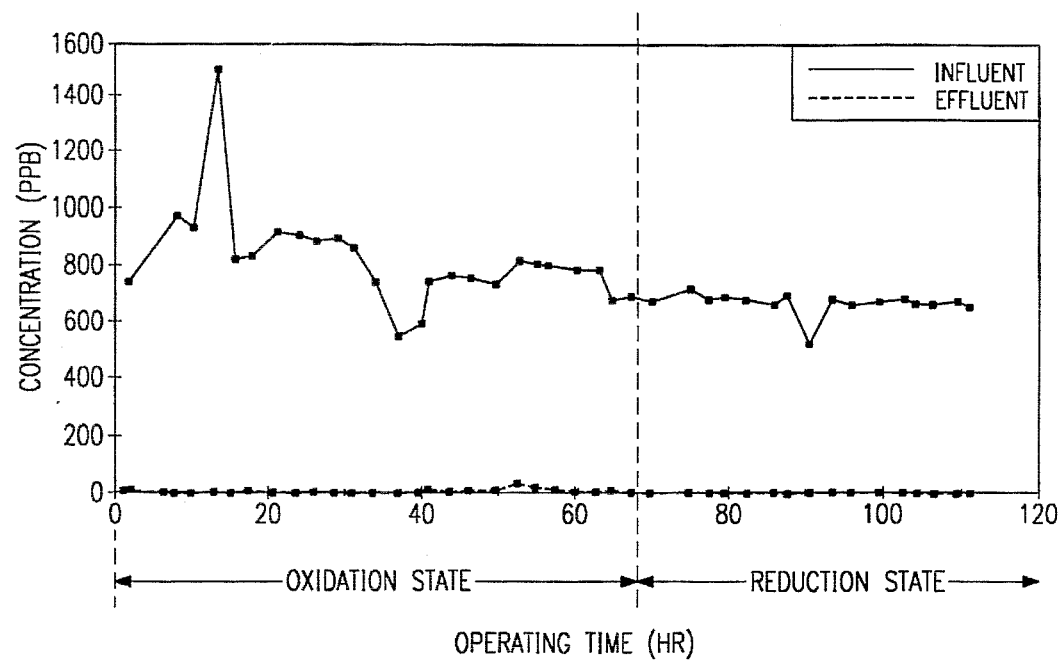
FIG. 4 illustrates the destruction plot of 2,4,6-trinitrotoluene, in accordance with an example of a preferred embodiment of the present invention.
Figure 5:
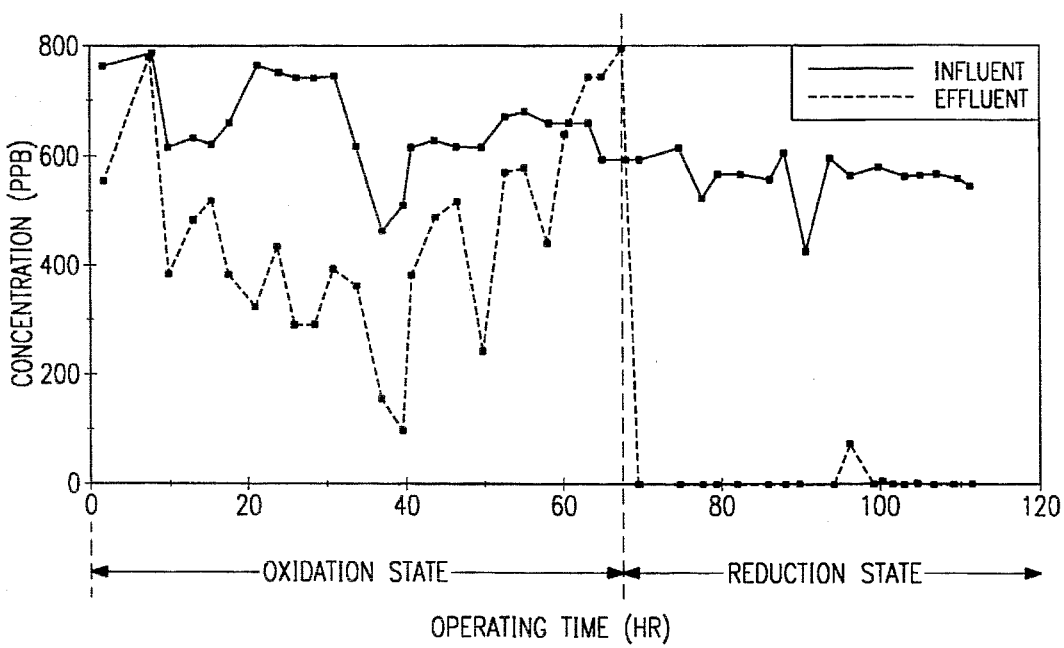
FIG. 5 illustrates the destruction plot of 1,3,5-trinitrobenzene, in accordance with an example of a preferred embodiment of the present invention.

FIGS. 4 and 5 illustrate charts comparing the respective concentrations of both TNT and TNB in the contaminated influent as well as the decontaminated effluent in view of the operating time of the photocatalytic treatment of the contaminated fluid, in connection with the particular example. By only utilizing the oxidation state of $TiO_2$, TNT is oxidized from the contaminated influent so that the concentration of TNT in the decontaminated effluent is rendered negligible. However, the concentration of TNB is not rendered negligible by the oxidation state since TNB is the by-product of TNT oxidation and is refractive to oxidation attempts. Therefore, after the initial oxidation state, a reduction state is invoked to target the TNB contaminant molecules through the addition of citric acid, as denoted in FIGS. 4 and 5. A concentration of approximately 40 mg. of citric acid for each liter of contaminated influent was preferably employed in this particular example, and introduced to photocatalytic system 110 by operation of pump 108. As illustrated in FIG. 5, the concentration of TNB dramatically decreases upon the introduction of citric acid to negligible levels, specifically, at the operating time of approximately seventy (70) hours.

The foregoing detailed description has been directed to particular embodiments of the invention for the purposes of illustration and explanation. It will be apparent, however, to those skilled in this art that modifications and changes in the compositions and processes set forth will be possible without departing from the scope and spirit of the invention.

What is claimed is:

1. A method for purifying a contaminated fluid by photocatalytic treatment, comprising:

(a) providing a contaminated fluid including contaminant molecules in the presence of a photocatalyst;

(b) exciting said photocatalyst with ultraviolet light to form photocatalyst conduction band electrons and positive holes thereby inducing an oxidation state whereby some contaminant molecules are oxidized;

(c) inducing a reduction state, in the substantial absence of oxidizing agents that compete for said photocatalyst conduction band electrons, by adding a reactant comprising a carboxylic acid in sufficient quantity to provide surrogate electrons that react with said positive holes formed on the photocatalyst while the semiconductor catalyst is irradiated whereby other contaminant molecules are reduced by said photocatalyst conduction band electrons.

2. The method as recited in claim 1, wherein:

the reactant comprises a hydroxy carboxylic acid.

3. The method as recited in claim 1, wherein:

the reactant comprises citric acid.

4. The method as recited in claim 1, further comprising:

reverting to the oxidation state by the addition of an oxidizing agent.

5. The method as recited in claim 4, wherein:

the oxidizing agent is selected from the group consisting of: oxygen, ozone, hydrogen peroxide, persulphate ions, bromate ions, chlorate ions, peroxymonophosphate ions, peroxymonosulphate ions, perchlorate ions, permanganate ions, ferrate ions and, peroxyacetic acid.

6. The method as recited in claim 1, wherein:

the semiconductor catalyst is $TiO_2$.

7. A method for purifying a contaminated fluid, comprising:

(a) mixing a contaminated fluid with photocatalytic particles to form a slurry;

(b) irradiating the slurry with ultraviolet light to excite the photocatalytic particles and render pairs of electrons and holes in the photocatalytic particles;

(c) oxidizing contaminants found in the slurry by utilization of the electron/hole pairs in the photocatalytic particles;

(d) adding a reactant, in the substantial absence of oxidizing agents that compete for said electrons of said electron/hole pairs, said reactant comprising a carboxylic acid in sufficient quantity that provides surrogate electrons to the slurry, the surrogate electrons reacting at the holes of the photocatalytic particles so as to isolate the electrons for reduction of other contaminants.

8. The method as recited in claim 7, wherein:

the photocatalytic particles comprises $TiO_2$.

9. The method as recited in claim 7, wherein: the reactant comprises citric acid.

10. The method as recited in claim 7, wherein:

the contaminated fluid comprises water.

11. A method for purifying a contaminated fluid by photocatalytic treatment, comprising:

(a) providing a contaminated fluid including contaminant molecules in the presence of semiconductor particles;

(b) irradiating the semiconductor particles with ultraviolet light to form photocatalyst conduction band electrons and positive holes;

(c) supplying a reducing agent to the contaminated fluid, in the substantial absence of oxidizing agents that compete for said photocatalyst conduction band electrons, while the semiconductor particle is irradiated, said reducing agent comprising a carboxylic acid in sufficient quantity to provide surrogate electrons that react with said positive holes formed on the photocatalyst such that certain contaminant molecules are destroyed.

12. The method as recited in claim 11, further comprising:

deaerating the environment in which the contaminated fluid and semiconductor particles are present.

13. The method as recited in claim 1, wherein:

the reducing agent comprises a hydroxy carboxylic acid.

14. The method as recited in claim 11, wherein:

the reducing agent comprises citric acid.

* * * * *